UNITED STATES PATENT OFFICE.

FRITZ HOFMANN AND KONRAD DELBRÜCK, OF ELBERFELD, AND KURT MEISENBURG, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING CAOUTCHOUC SUBSTANCES.

1,178,721.  Specification of Letters Patent.  Patented Apr. 11, 1916.

No Drawing.  Application filed November 25, 1911.  Serial No. 662,383.

*To all whom it may concern:*

Be it known that we, FRITZ HOFMANN, KONRAD DELBRÜCK, and KURT MEISENBURG, doctors of philosophy, chemists, citizens of the German Empire, residing at, respectively, Elberfeld, Elberfeld, and Leverkusen, near Cologne, Germany, have invented new and useful Improvements in Processes of Producing Caoutchouc Substances, of which the following is a specification.

In earlier applications processes for the manufacture and production of substances similar to caoutchouc are described, which processes consist in heating hydrocarbons of the butadiene series such as butadiene its homologues and analogues with or without the addition of agents accelerating polymerization or by submitting these hydrocarbons to the action of alkaline or alkaline earth metals or of mixtures, alloys or amalgams thereof, or by submitting them in the cold or in the heat to the action of organic substances such as starch, albumen, urea, glycerin or compounds of a similar behavior.

We have now found that the polymerization of the said hydrocarbons described in earlier applications can be promoted by carrying out these processes with the addition of natural caoutchouc or of the caoutchouc like substances described in earlier applications.

In order to illustrate the new process more fully the following examples are given, the parts being by weight:—

Example 1: To 100 parts of the caoutchouc like product obtained from butadiene by the action of sodium, 100 parts of erythrene liquefied by cooling are added. The resulting mixture is then allowed to stand. After some time the polymerization is quantitatively complete.

Example 2: To 500 parts of caoutchouc obtained by polymerization of isoprene in the incubator by means of blood serum 250 parts of isoprene are added. The mixture is kept in the incubator. After some time it is quantitatively polymerized to a caoutchouc like product.

Example 3: To 1000 parts of the product obtained by polymerization of beta-gamma-dimethylbutadiene 1000 parts of dimethylbutadiene are added. The hydrocarbon is completely soaked up by the caoutchouc. The mixture is then heated in a closed vessel for 4 weeks to 70° C. After this time the hydrocarbon has disappeared and the caoutchouc like substance is obtained.

Example 4: To 500 parts of the caoutchouc-like product obtained by polymerization of isoprene, 250 parts of isoprene and 25 parts of starch are added, and the mixture is kept in an incubator. After some time it is quantitatively polymerized to a caoutchouc like product.

Not only is the process of the present invention an advantageous process of polymerizing the hydrocarbons into a caoutchouc-like product, but the resulting products contain the thus formed caoutchouc in most intimate combination with the caoutchouc-like product used in effecting the polymerization.

We claim:—

1. The process of producing a composite caoutchouc substance which comprises mixing a hydrocarbon of the butadiene series with about an equal amount of caoutchouc and polymerizing the hydrocarbon in such intermixture to give a composite caoutchouc substance.

2. The process of producing caoutchouc substances which comprises polymerizing beta-gamma-dimethylbutadiene by heating in the presence of a caoutchouc substance.

3. The process of producing caoutchouc substances which comprises polymerizing beta-gamma-dimethylbutadiene by heating in the presence of a synthetic caoutchouc substance.

4. The process of producing caoutchouc substances which comprises polymerizing beta-gamma-dimethylbutadiene by heating in the presence of a synthetic caoutchouc substance obtained by polymerizing beta-gamma-dimethylbutadiene.

5. The process of producing caoutchouc substances which comprises adding to an erythrene hydrocarbon a caoutchouc substance sufficient in amount to absorb a considerable amount of such hydrocarbon, and converting the thus absorbed hydrocarbon into a caoutchouc substance in intimate combination with the added caoutchouc substance.

6. The process of producing caoutchouc substances which comprises absorbing beta-gamma-dimethyl erythrene in a polymerization product of such hydrocarbon, and polymerizing the thus absorbed hydrocarbon to convert the same into a caoutchouc substance by heating.

In testimony whereof we have hereunto set our hands in the presence of two subscribing witnesses.

FRITZ HOFMANN. [L. S.]
KONRAD DELBRÜCK. [L. S.]
KURT MEISENBURG. [L. S.]

Witnesses:
ALBERT NUFER,
HELEN NUFER.